United States Patent
Maekawa

(10) Patent No.: US 7,362,670 B2
(45) Date of Patent: Apr. 22, 2008

(54) OPTICAL DISC DRIVE

(75) Inventor: Yuichi Maekawa, Atsugi (JP)

(73) Assignee: Mitsumi Electric Co., Ltd. (JP)

( * ) Notice: Subject to any disclaimer, the term of this patent is extended or adjusted under 35 U.S.C. 154(b) by 989 days.

(21) Appl. No.: 10/471,973

(22) PCT Filed: Apr. 8, 2002

(86) PCT No.: PCT/JP02/03487

§ 371 (c)(1),
(2), (4) Date: Jan. 20, 2004

(87) PCT Pub. No.: WO03/079334

PCT Pub. Date: Sep. 25, 2003

(65) Prior Publication Data

US 2004/0114485 A1   Jun. 17, 2004

(30) Foreign Application Priority Data

Mar. 18, 2002   (JP) .............................. 2002-74839

(51) Int. Cl.
*G11B 7/00* (2006.01)
(52) U.S. Cl. .................................. 369/47.38
(58) Field of Classification Search ............. 369/47.38, 369/47.39, 47.36, 47.27, 47.28, 47.1
See application file for complete search history.

(56) References Cited

U.S. PATENT DOCUMENTS 6,496,462 B2   12/2002   Kuribayashi et al.
7,012,867 B2 *   3/2006   Kurobe et al. ........... 369/47.48
2001/0043539 A1   11/2001   Kuribayashi et al.

FOREIGN PATENT DOCUMENTS

| EP | 1143427 | 10/2001 |
| JP | 52024027 | 2/1977 |
| JP | 61045416 | 3/1986 |
| JP | 4330639 | 11/1992 |
| JP | 527813 | 4/1993 |
| JP | 2001344763 | 12/2001 |

* cited by examiner

*Primary Examiner*—Nabil Hindi
(74) *Attorney, Agent, or Firm*—Marger Johnson & McCollom, P.C.

(57) ABSTRACT

An optical disc drive that can carry out recording data to an optical disc such as a format procedure of the optical disc in a relatively short time is provided. An optical disc drive 1 has a rotation driving mechanism for rotating a loaded optical disc 2 at any one of multiple rotational speed (rotation number) levels, an optical pick-up 3 capable of moving in a radial direction of the loaded optical disc 2 to overwrite information (data) onto the optical disc 2 by emitting a laser beam thereto, and an optical pick-up moving mechanism including a sled motor 7 for moving the optical pick-up 3 in the radial direction of the optical disc 2. In a case that the optical disc 2 is a blank disc having no recording history, i.e., in a case of a first recording procedure of the optical disc 2, the optical disc drive 1 carries out recording at a recording speed higher than the highest recording speed for overwriting.

9 Claims, 2 Drawing Sheets

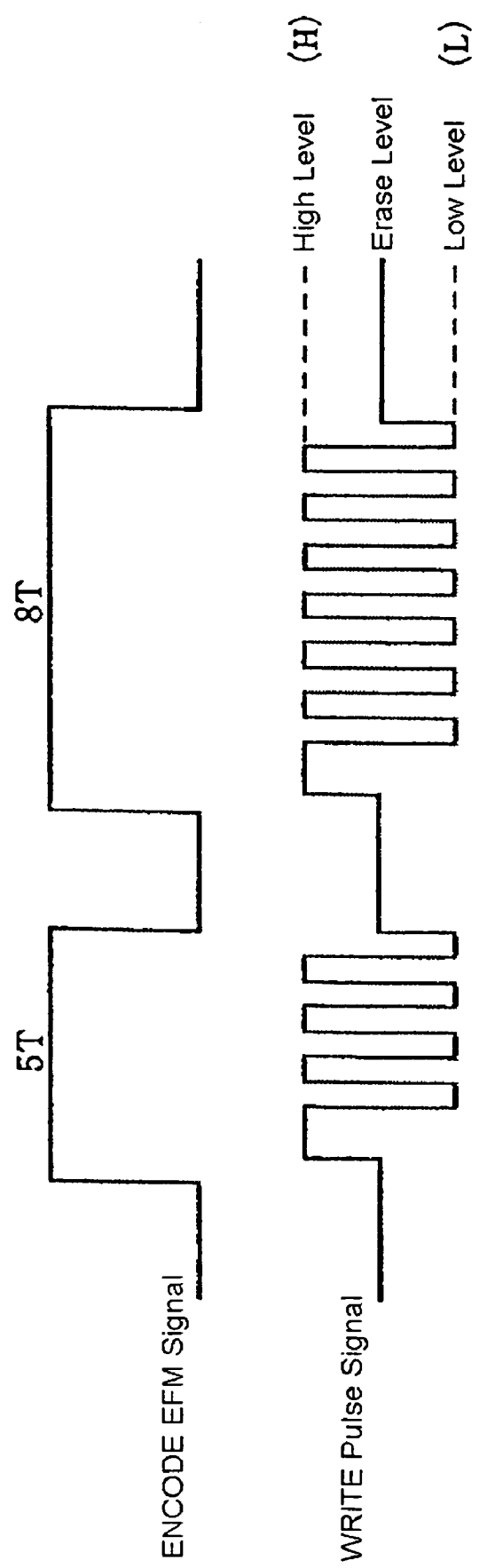

OPTICAL DISC DRIVE

TECHNICAL FIELD

The present invention relates to an optical disc drive.

BACKGROUND ART

There is known optical disc drives, which record (overwrite) and/or reproduce information on an optical disc that is overwritable (rewritable), such as CD-RW and the like.

Such optical disc drives include: a rotational driving mechanism for rotating a loaded optical disc at any one of multiple rotational speed (rotation number) levels; an optical pick-up (optical head) which is provided movably in a radial direction with relative to the loaded optical disc for emitting a laser beam to be able to record information (data) on the disc; and an optical pick-up moving mechanism equipped with a sled motor for moving the optical pick-up in the radial direction.

The optical disc drives having such a function for recording information are sometimes formatted at a format called packet writing, for example. Such a formatted optical disc can be utilized like a floppy disk ("floppy" is a registered mark).

This format procedure for an optical disc is carried out at a recording speed (that is, writing data transfer rate) same as the highest recording speed (the highest recording speed for overwriting) in a case of carrying out overwriting procedure for an optical disc. If the highest recording speed for overwriting is decuple speed (10× speed) of the reference rotational speed (1× speed) for example, the format procedure for an optical disc is carried out at the decuple speed, whereby it takes about eight minutes to format an optical disc.

Namely, this means that the conventional optical disc drives require relatively long time for formatting an optical disc.

SUMMARY OF THE INVENTION

It is an object of the present invention to provide an optical disc drive that can carry out a recording procedure onto an optical disc such as format procedure in relatively short time.

In order to achieve the above object, the present invention is directed to an optical disc drive that can record data from or record and reproduce data to and from an optical disc when the optical disc is loaded into the optical disc drive. The optical disc drive of the present invention comprises a rotational driving mechanism for rotating the loaded optical disc at any one of multiple rotation speed levels, and an optical pick-up capable of overwriting data to the optical disc by emitting a laser beam to the optical disc. The optical disc drive is constituted so that data can be recorded at a predetermined recording speed higher than the highest recording speed for overwriting if the optical disc is a blank disc having no recording history.

It is preferred that the optical disc drive comprises blank-disc determining means for determining whether the optical disc is a blank disc having no recording history or not.

In this case, it is preferred that the blank-disc determining means attempts to detect a predetermined signal from the optical disc via the optical pick-up, and that the optical disc drive is constituted so as to determine the optical disc as a blank disc if the predetermined signal can not be detected.

Further, it is preferred that the optical disc drive is constituted so as to carry out the detection procedure of the predetermined signal while the optical pick-up moves so as to cross at least one track of the optical disc.

In this case, it is preferred that the optical disc drive is constituted so as to carry out the detection procedure of the predetermined signal while the optical pick-up is moved at least from one side to the other side of the region of the optical disc in which data can be recorded.

Further, the predetermined signal is preferably an HF signal.

Furthermore, it is preferred that the optical disc from/to which the optical disc drive reproduce and/or record data includes a CD-RW.

Therefore, according to the present invention, in a first recording procedure of data onto an optical disc, such as a format procedure of an optical disc, a recording procedure of normal information (data) and the like, its recording time can be shortened (reduced).

Further, if the optical disc drive of the present invention has blank-disc determining means, it is not necessary for a user to input on the optical disc drive that the optical disc such as CD-RW is a blank disc having no recording history, thereby facilitating the operations of the optical disc drive.

BRIEF DESCRIPTION OF THE DRAWINGS

FIG. 2 is a timing chart illustrating an ENCODE EFM signal outputted from an encoder and a WRITE pulse signal outputted from a laser control section in the optical disc drive shown in FIG. 1 according to the present invention.

BEST MODE FOR CARRYING OUT THE INVENTION

Figure 1:
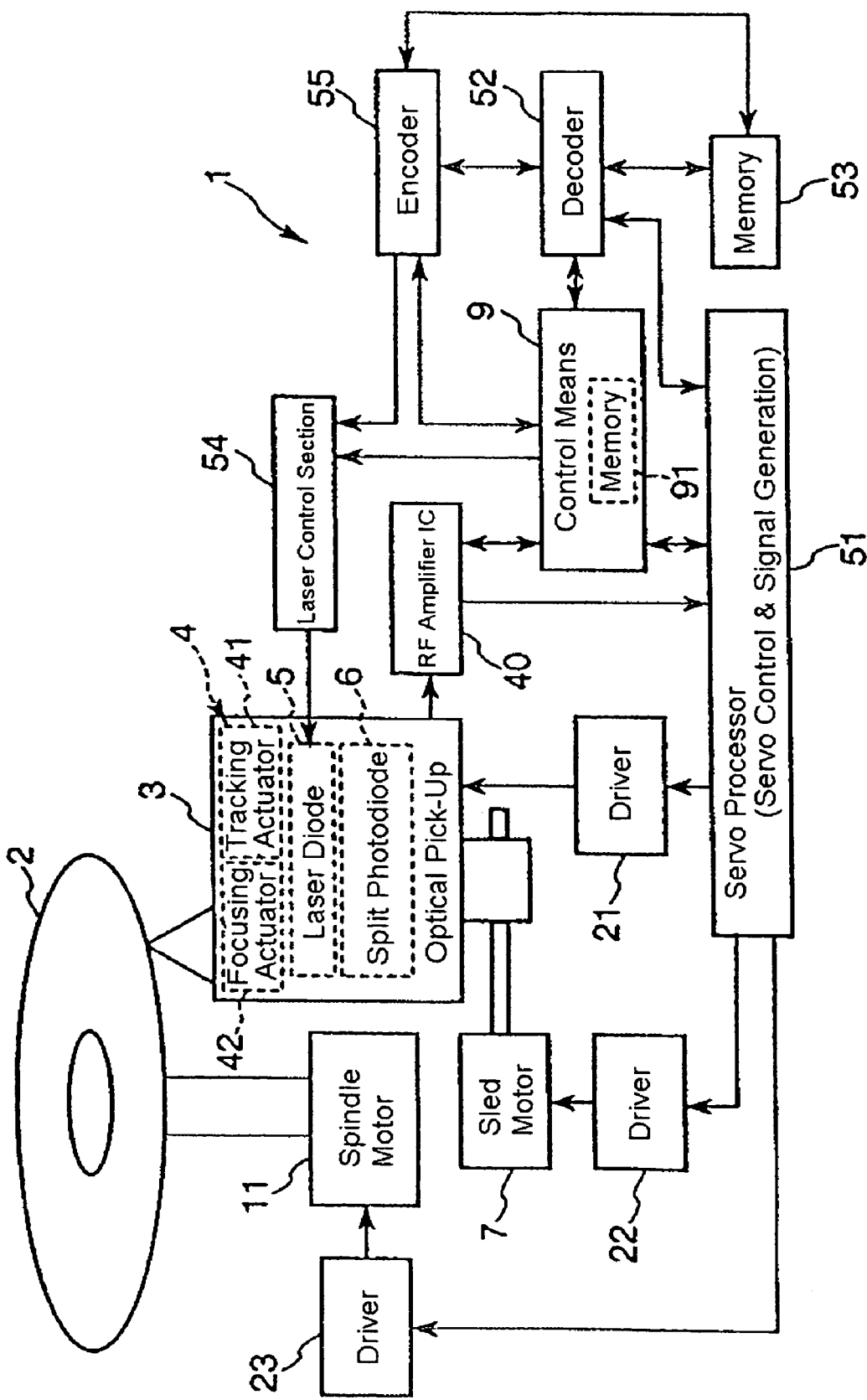
FIG. 1 is a block diagram illustrating an embodiment of an optical disc drive according to the present invention.

A detailed description will now be given for the preferred embodiments of an optical disc drive according to the present invention with reference to the appended drawings.

FIG. 1 is a block diagram illustrating an embodiment of an optical disc drive according to the present invention.

The optical disc drive 1 shown in FIG. 1 may record and/or reproduce data (information) onto and/or from an optical disc 2 that is overwritable (rewritable) (for example, CD-RW). In other words, the optical disc drive 1 is a drive that can overwrite and/or reproduce data onto and/or from the optical disc 2.

A spiral pre-groove (WOBBLE) (not shown) is formed along tracks in the optical disc 2.

The spiral pre-groove is recorded with Absolute Time In Pre-groove (ATIP) information (time information), and meanders for a predetermined period (22.05 kHz as a reference speed) in a radial direction of the optical disc 2. More specifically, the ATIP information to be recorded is biphase modulated and frequency-modulated at a carrier frequency of 22.05 kHz.

The pre-groove may function as a guide groove to form pits and/or lands (recording of pits and lands) for optical disc 2. Further, information recorded in the pre-groove may be utilized for controlling a rotational speed of the optical disc 2. Additionally, the information recorded may be reproduced and used to specify a recording position (absolute time) on the optical disc 2.

The optical disc drive 1 has a rotation driving mechanism for rotating a turntable on which an optical disc 2 is loaded at multiple rotational speed (rotation number) levels. The rotation driving mechanism mainly has a spindle motor 11 for rotating a turntable, a driver 23 for driving the spindle motor 11, and the turntable (not shown) on which the optical disc 2 is provided, which is fixed to a rotation shaft of the spindle motor 11.

Further, the optical disc drive 1 includes an optical pick-up (optical head) 3 capable of moving in a radial direction of the loaded optical disc 2 (a radial direction of the turntable with respect to the optical disc 2 that is loaded on the turntable); an optical pick-up moving mechanism for moving the optical pick-up 3 in the radial direction of the optical disc 2 or the turntable; a control means 9; an RF amplifier IC 40; a servo processor (DSP) 51; a decoder 52; a memory 53 such as RAM (Random Access Memory) and the like; a laser control section 54; and an encoder 55. Hereinafter, the radial direction of the optical disc 2 loaded in the optical disc drive 1 will be referred to simply as "the radial direction."

The optical pick-up moving mechanism mainly includes a sled motor 7, a driver 22 for driving the sled motor 7, and a power transmission mechanism (not shown). A rotational speed of the sled motor 7 can be decelerated and transmitted to the optical pick-up 3 by the power transmission mechanism, thereby converting the rotational movement of the sled motor 7 into the linear movement of the optical pick-up 3.

The optical pick-up 3 includes an optical pick-up body (optical pick-up base) (not shown) that may be equipped with a laser diode (light source) 5 for emitting a laser beam and a split photodiode (light-receiving portion) 6, and an objective lens (condenser) (not shown). The laser diode 5 is driven and controlled by means of the laser control section 54.

The objective lens is supported by suspension springs (biasing means) (not shown in the drawings) provided on the optical pick-up base. Further, the objective lens is arranged so as to be movable with respect to the optical pick-up base in both a radial direction of the turntable and an optical axis direction of the objective lens (i.e., the rotational direction of the optical disc 2 (turntable)). Hereinafter, the direction of the optical axis of the objective lens will be referred to simply as the "optical axis direction," and the direction of the rotational axis of the optical disc 2 will be referred to simply as the "rotational axis direction."

The objective lens is initially positioned at a reference position (center point) of the objective lens, which is predetermined on the optical pick-up base, i.e., a neutral position. Hereinafter, the reference position of the objective lens will be referred to simply as the "reference position."

When the objective lens is deviated away from its reference position, it is biased back toward the reference position by the restoring force of the suspension springs.

Further, the optical pick-up 3 has an actuator 4 for moving the objective lens with respect to the optical pick-up base. The actuator 4 includes a tracking actuator 41 for moving the objective lens in the radial direction with respect to the optical pick-up base, and a focusing actuator 42 for moving the objective lens in the optical axis direction (rotational axis direction).

The tracking actuator 41 and the focusing actuator 42 of the actuator 4 may be respectively driven by the driver 21.

The control means 9 is generally constituted from a microcomputer (CPU). The control means 9 carries out overall control of the optical disc drive 1. Namely, the control means 9 controls the optical pick-up 3 (including the actuator 4, the laser diode 5 and the like), the sled motor 7, the spindle motor 11, the RF amplifier IC 40, the servo processor 51, the decoder 52, the memory 53, the laser control section 54, the encoder 55, and the like. In this case, the control means 9 incorporates a memory 91 such as ROM (Read Only Memory) and RAM.

The main function of blank-disc determining means for determining whether or not an optical disc 2 is a blank disc having no recording history is carried out by means of the control means 9. In this regard, the blank-disc determining means will be described later in detail.

The optical disc drive 1 may be removably connected to an external device such as a computer via an interface control section (not shown in the drawings) to carry out data communications between the optical disc drive 1 and the external device.

Next, operation of the optical disc drive 1 will be described.

The optical disc drive 1 moves the optical pick-up 3 to a target track (target address). When the optical pick-up 3 reaches the target track, the optical disc drive 1 carries out various controls such as focus serve control, tracking servo control, sled servo control and rotation number control (rotational speed control) and the like. In this way, the optical disc drive 1 records (writes) and reproduces (reads out) information (data) to and from a predetermined track (target track) of the optical disc 2.

When data (signals) is recorded onto the optical disc 2, data (ATIP information and recorded data) is reproduced from the pre-groove that is formed on the optical disc 2, and then the data is recorded onto the optical disc 2 along the pre-groove.

When the data (signals) to be recorded onto the optical disc 2 is inputted into the optical disc drive 1 via an interface control section (not shown), the data is inputted into the encoder 55.

The data is encoded in the encoder 55, and then undergoes modulation (EFM modulation) by a modulation method known as EFM (Eight to Fourteen Modulation) to form ENCODE EFM signals.

The ENCODE EFM signals are signals formed from pulses each having a predetermined length (period) of any one of 3T-11T. The ENCODE EFM signals are inputted from the encoder 55 to the laser control section 54.

Further, an analog WRITE pulse signal (voltage) is outputted from a D/A converter (not shown in the drawings) incorporated in the control means 9 and then inputted into the laser control section 54.

The laser control section 54 may switch the level of the WRITE pulse signal inputted from the control means 9 among a high level (H), an erase level and a low level (L) based on the ENCODE EFM signal. Then, the laser control section 54 outputs the signal having any one of these levels, thereby controlling the drive (operations) of the laser diode 5 in the optical pick-up 3.

FIG. 2 is a timing chart illustrating the ENCODE EFM signal outputted from the encoder 55 and the WRITE pulse signal outputted from the laser control section 54.

As shown in FIG. 2, the laser control section 54 alternates the high-level (H) WRITE pulse signal and the low-level (L) WRITE pulse signal to output the signal while the ENCODE EFM signal is in a high level (H), thereby increasing the output of the laser beam (in order to establish a writing output). On the other hand, the laser control section 54 outputs the erase-level (DC level) WRITE POWER signal while the ENCODE EFM signal is in a low level (L), thereby decreasing the output of the laser beam.

Accordingly, when the ENCODE EFM signal is in the high (H) level, a pit having a predetermined length is formed (written) in the optical disc 2, and when the ENCODE EFM signal is in the low (L) level, a land having a predetermined length is formed (written) in the optical disc 2.

In this way, data is written (recorded) in a predetermined track of the optical disc 2.

Data is recorded from the inner side of the optical disc 2 toward its outer side along the pre-groove in the optical disc 2.

In the encoder 55, a predetermined ENCODE EFM signal (random EFM signal) is generated in addition to the above-mentioned ENCODE EFM signal. The random EFM signal is used for output adjustment (power control) of the laser when trial writing in a test area is carried out under OPC (Optimum Power Control) procedure for determining an optimum laser output during recording of data.

When data (signals) is to be reproduced (read out) from the optical disc 2, the level of the WRITE pulse signal supplied from the laser control section 54 is maintained at a predetermined DC level corresponding to a read-out output. Thus, the output of laser beam is maintained at the read-out output level.

During reproduction, the laser beam is emitted to a predetermined track of the optical disc 2 from the laser diode 5 in the optical pick-up 3. The laser beam is reflected on the optical disc 2, and the reflected beam is received by means of the split photodiode 6 in the optical pick-up 3.

Then, electrical current in response to the amount of light received is outputted from the split photodiode 6. This current is then converted into the voltage by means of an I-V amplifier (not shown in the drawings) in order to be outputted from the optical pick-up 3.

The voltage outputted from the optical pick-up 3 (detected signal) is inputted into the RF amplifier IC 40. In the RF amplifier IC 40, the detected signal undergoes predetermined signal processing such as addition, amplification and the like to generate an HF (RF) signal. The HF signal is an analog signal corresponding to pits and lands written onto (formed in) the optical disc 2.

The HF signal is inputted into the servo processor 51. In the servo processor 51, the HF signal is digitized, and then undergoes EFM demodulation (Eight to Fourteen Modulation). As a result, an EFM signal may be obtained. The EFM signal is a signal formed by pulses each having a length (period) corresponding to any one of 3T-11T.

The EFM signal is converted (decoded) into a predetermined form of data (DATA signal) in the servo processor 51, and then inputted into the decoder 52.

Then, the data is decoded to a predetermined form of data for communication (transmission) in the decoder 52, and transmitted to the external device such as a computer via the interface control section (not shown in the drawings).

Tracking control, sled control, focus control, and rotation number control (rotational speed control) in the reproducing operation, which are mentioned above, are carried out as follows.

As mentioned above, the voltage signal, into which the current signal supplied from the split photodiode 6 in the optical pick-up 3 is converted, is inputted into the RF amplifier IC 40.

The RF amplifier IC 40 generates the tracking error (TE) signal (voltage signal) based on the current-voltage (I-V) converted signal supplied from the split photodiode 6.

The tracking error signal is a signal that represents an amount of displacement of the objective lens in the radial direction from the center of the track (i.e., a shift length of the objective lens in the radial direction from the center of the track) and the direction thereof.

The tracking error signal is inputted into the servo processor 51. In the servo processor 51, the tracking error signal may undergo predetermined signal processing such as inversion of phase, amplification and the like, thereby generating a tracking servo signal (voltage signal). Based on the tracking servo signal, a predetermined drive voltage is applied to the tracking actuator 41 via the driver 21. The objective lens moves toward the center of the track by driving the tracking actuator 41. Namely, the tracking servo is engaged.

A limit exists to follow the objective lens to the track only with the drive of the tracking actuator 41. Therefore, to cover the tracking, the objective lens may be controlled so as to be returned to the reference position (carry out the sled control) by moving, under the drive of the sled motor 7 via the driver 22, the optical pick-up base toward the direction equal to the moving direction of the objective lens.

The RF amplifier IC 40 also generates a focus error (FE) signal (voltage signal) based on the current-voltage converted signal supplied from the split photodiode 6.

The focus error signal is a signal that represents an amount of displacement of the objective lens in the optical axis direction (rotational axis direction) from a focus position (i.e., a shift length of the objective lens from the focus position in the optical axis direction (rotational axis direction)).

The focus error signal is inputted into the servo processor 51. In the servo processor 51, the focus error signal may undergo predetermined signal processing such as inversion of phase, amplification and the like, thereby generating a focus servo signal (voltage signal). Based on the focus servo signal, the predetermined driving voltage is applied to the focusing actuator 42 via the driver 21. The objective lens moves toward the focus position by driving the focusing actuator 42. Namely, the focus servo is engaged.

Further, in the servo processor 51, a control signal (voltage signal) to control the rotation number (rotational speed) of the spindle motor 11, i.e., a control signal to set to a target value the rotation number of the spindle motor 11, is generated. Then the control signal is inputted into the driver 23.

The driving signal (voltage signal) to drive the spindle motor 11 is generated based on the control signal in the driver 23.

The driving signal outputted from the driver 23 is inputted into the spindle motor 11. The spindle motor 11 is then driven based on the driving signal. Further, the spindle servo is engaged so that the rotation number of the spindle motor 11 becomes equal to the target value.

Further, when the optical pick-up 3 (i.e., the objective lens) is moved to a target position on the optical disc 2, i.e., a target track (target address), track jump control operation is carried out. In the track jump control operation, the drive of the sled motor 7 and the drive of the actuator 4 are respectively controlled to move the optical pick-up 3 (objective lens) to the target track (target address) by carrying out a rough search (rough seek), a fine search (accurate seek) or a combination thereof.

The optical disc drive 1 is constituted so that the recording speed (that is, in this embodiment, writing data transfer rate or writing speed), i.e., rotational speed (rotation number) of the optical disc 2 during recording data can be set at any one of the rotational speeds of m levels (m is an integer that is greater than or equal to 2).

For example, the recording speed, i.e., the rotational speed of the optical disc 2 can be set at any one of 1× speed (minimum speed), 2× speed, 4× speed, 6× speed, 8× speed, 10× speed, 12× speed, 16× speed, 32× speed and the like.

In this regard, N× speed (N is an integer that is greater than or equal to 2) refers to a rotational speed that is N times of a reference rotational speed, to which 1× speed (minimum speed) is determined. Thus, if the recording speed is set to N× speed, the optical disc 1 carries out the recording procedure after the rotational speed of the optical disc 2 is set to the rotational speed that is N times of the reference rotational speed.

Further, in the optical disc drive 1, the highest recording speed when to carry out an overwriting procedure (hereinafter, it will be referred to simply as the "highest recording speed for overwriting") is set.

If the optical disc 2 is a blank disc that has no recording history (hereinafter, it will be referred to simply as "blank disc"), i.e., if a optical disc 2 is recorded for the first time, the optical disc drive 1 is constituted so as to carry out recording procedure at a recording speed higher than the highest recording speed for overwriting mentioned above.

The "recording" of the recording history mentioned above includes not only an ordinary record of data but also, for example, a format of the optical disc 2 and the like.

In this regard, the blank-disc determining means (i.e., the control means 9) carries out determining procedures (distinguishing procedures) for determining the optical disc 2 is a blank disc or not.

When to determine whether the optical disc 2 is blank disc or not, focus control, tracking control and rotation number control (rotational speed control) are carried out. In this case, the optical pick-up 3 is moved in the radial direction in order to attempt to detect a predetermined signal (in the present embodiment, this signal is a HF signal) via the optical pick-up 3 so that the optical pick-up 3 moves across the tracks (at least one track) and pre-groove of the optical disc 2.

In the detection procedure of the HF signal, the optical pick-up 3 is moved at least from one side to the other side of the region of the optical disc 2 in which data can be recorded.

In this case, the optical pick-up 3 may be moved from the inner side of the optical disc 2 toward its outer side. On the other hand, the optical pick-up 3 may be moved from the outer side toward the inner side. However, it is preferred that the optical pick-up 3 is moved from the inner side toward the outer side in the present embodiment.

If the HF signal is not detected in the detection procedure of the HF signal, then it is determined that the optical disc 2 is a blank disc. On the other hand, if the HF signal is detected in the detection procedure, it is determined that the optical disc 2 is a disc having a recording history.

When it is determined that the optical disc 2 is a blank disc, the recording speed is set to a predetermined recording speed higher than the highest recording speed for overwriting, then data is recorded on the optical disc 2 at the predetermined recording speed.

These recording procedures include, for example, a format procedure in which the optical disc 2 is formatted by a variety of formats such as packet write and the like, and a recording procedure of normal data.

As described above, according to the optical disc drive 1 of the present invention, a first recording procedure of data onto the optical disc 2, such as a format procedure of an optical disc 2 having no recording history (i.e., a blank disc), a recording procedure of normal data onto the optical disc 2 and the like, can be carried out in a relatively short time.

Since the optical disc drive 1 has blank-disc determining means, it is not necessary for a user to input on the optical disc drive 1 that the optical disc 2 is a blank disc having no recording history, thereby facilitating the operations of the optical disc drive 1.

In addition, in a case that the optical disc 2 is a blank disc, i.e., in a case of a first recording procedure to the optical disc 2, the optical disc drive 1 of the present invention may be constituted so as to be able to set any one recording speed of a recording speed higher than the highest recording speed for overwriting, a recording speed same as the highest recording speed for overwriting and a recording speed lower than the highest recording speed for overwriting. Alternatively, in this case, the optical disc drive 1 of the present invention may be constituted so as to be able to set one recording speed of a recording speed higher than the highest recording speed for overwriting and a recording speed same as the highest recording speed for overwriting or one recording speed of a recording speed higher than the highest recording speed for overwriting and a recording speed lower than the highest recording speed for overwriting.

Namely, in the present invention, the optical disc drive 1 may be constituted so as to be able to set the recording speed higher than the highest recording speed for overwriting if the optical disc 2 is a blank disc.

Further, the blank-disc determining means is provided in the embodiment mentioned above, but in the present invention the blank-disc determining means may be omitted.

In a case that the blank-disc determining means is not provided in the optical disc drive 1, the optical disc drive 1 may be constituted so that, for example, a user inputs from an external device such as a computer that the optical disc 2 is a blank disc.

As described above, it should be noted that, even though the optical disc drive of the present invention has been described with reference to the embodiment shown in the drawings, the present invention is not limited to such a structure, various elements described above can be replaced with any other element capable of performing the same or a similar function.

It is possible to apply the present invention to various optical disc drives that can record and reproduce (overwrite and reproduce) data onto and from an overwritable (rewritable) optical disc such as CD-RW, DVD-RW, DVD-RAM and the like, or to various optical disc drives for recording only.

It is also possible to apply the optical disc drive of the present invention to other various optical disc drives for recording onto and reproducing from or recording onto various types of optical discs.

INDUSTRIAL APPLICABILITY

As described above, according to the present invention, in a first recording procedure of data onto an optical disc, such as a format procedure of an optical disc, a recording procedure of normal information (data) and the like, its recording time can be shortened (reduced).

Further, if the optical disc drive of the present invention has blank-disc determining means, it is not necessary for a user to input on the optical disc drive that the optical disc is a blank disc having no recording history, thereby facilitating the operations of the optical disc drive.

What is claimed is:
1. An optical disc drive which can record data to or record and reproduce data to and from an optical disc when the optical disc is loaded into the optical disc drive, the optical disc drive comprising:

a rotational driving mechanism for rotating the optical disc at any one of multiple rotational speed levels, the multiple rotational speed levels respectively corresponding to multiple levels of recording speed of the optical disc drive;

an optical pick-up for reproducing and/or recording data from/to the optical disc by emitting a laser beam onto the optical disc, the optical pick-up being capable of recording data onto previously recorded data to overwrite; and means for selecting one of the multiple rotational speed levels so that the optical disc drive records data onto the optical disc at a recording speed higher than the highest recording speed for overwriting in a case that it is determined that the optical disc is a blank disc having no recording history.

2. The optical disc drive according to claim 1, further comprising blank-disc determining means for determining whether the optical disc is a blank disc having no recording history or net a recorded disc into which data has been recorded.

3. The optical disc drive according to claim 2, wherein the blank-disc determining means includes detecting means for detecting a predetermined signal from the optical disc via the optical pick-up, and determines that the optical disc is a blank disc in a case that the detecting means does not detect the predetermined signal while the blank-disc determining means attempts to detect the predetermined signal.

4. The optical disc drive according to claim 3, wherein the selecting means selects one of the multiple rotational speed levels in response to a detected result by the detecting means of the blank-disc determining means.

5. The optical disc drive according to claim 3, wherein the blank-disc determining means is constituted so as to carry out the detection procedure of the predetermined signal while the optical pick-up moves so as to cross at least one track of the optical disc.

6. The optical disc drive according to claim 5, wherein the blank-disc determinina means is constituted so as to carry out the detection procedure of the predetermined signal while the optical pick-up is moved at least from one side to the other side of the region of the optical disc in which data can be recorded.

7. The optical disc drive according to claim 3, wherein the predetermined sianal is an HF sianal.

8. The optical disc drive according to claim 1, wherein the optical disc to/from which the optical disc drive records and/or reproduces data includes a CD-RW.

9. The optical disc drive according to claim 1, wherein the selecting means selects one of the multiple rotational speed levels in response to a signal that is inputted from an external device to the optical disc drive.

* * * * *